Figure 1:
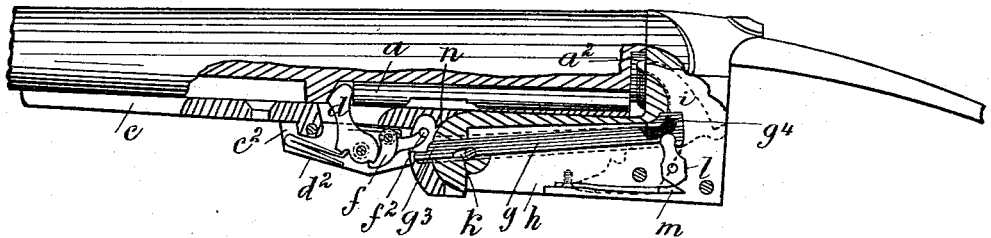

(No Model.)

J. DEELEY, Jr.
CARTRIDGE EXTRACTOR FOR BREAKDOWN GUNS.

No. 335,021. Patented Jan. 26, 1886.

Witnesses,
George Shaw
Richard Skerrett

Inventor
John Deeley Junr (No Model.)

J. DEELEY, Jr.
CARTRIDGE EXTRACTOR FOR BREAKDOWN GUNS.

No. 335,021. Patented Jan. 26, 1886.

Witnesses,
George Shaw
Richard Skerrett

Inventor,
John Deeley Junr.

(No Model.) 3 Sheets—Sheet 3.

J. DEELEY, Jr.
CARTRIDGE EXTRACTOR FOR BREAKDOWN GUNS.

No. 335,021. Patented Jan. 26, 1886.

Witnesses,
George Law
Richard Skerrett

Inventor,
John Deeley Junr

UNITED STATES PATENT OFFICE.

JOHN DEELEY, JR., OF ASTON, COUNTY OF WARWICK, ENGLAND.

CARTRIDGE-EXTRACTOR FOR BREAKDOWN GUNS.

SPECIFICATION forming part of Letters Patent No. 335,021, dated January 26, 1886.

Application filed November 18, 1885. Serial No. 183,239. (No model.) Patented in England November 3, 1884, No. 14,526.

*To all whom it may concern:*

Be it known that I, JOHN DEELEY, the younger, of Aston, in the county of Warwick, England, gun-manufacturer, a subject of the Queen of Great Britain, have invented Improvements in the Extracting Mechanism of Dropdown Small-Arms, (for which I have obtained a patent in Great Britain, No. 14,526, bearing date November 3, 1884,) of which the following is a specification.

My invention consists of the improvements hereinafter described in the extracting mechanism of dropdown small-arms, whereby the case of the exploded cartridge is ejected on the raising of the breech ends of the barrels for recharging.

In the ordinary extractor of dropdown guns the case of the exploded cartridge is "started" or drawn a short distance from the end of the barrel on the raising of the breech ends of the barrels, the complete removal of the case being effected by hand. I employ the ordinary mechanism for starting the cartridge-case, but supplement it by the mechanism hereinafter described, whereby the started cartridge-case is ejected from the barrel. On the under side of the barrel I place a nearly vertical short arm, turning upon a center-pin supported by two small plates on the fore-end. This arm has a bent at front—that is, at the side turned toward the break-off—and a shoulder at back. A strong spring presses under the shoulder, while a lever, similar to an ordinary sear, engages in the bent at the front of the said arm. In the body of the gun is an oblique sliding rod, the upper end of which is in front of the breast of the hammer, the lower end of the said rod being under the end of the sear described when the parts are in the positions they occupy after the gun has been discharged.

On lifting the breech ends of the barrels for recharging, the sear-like lever strikes against the end of the sliding rod described, and is disengaged from the bent in the vertical arm. The said arm is urged forward by its spring, and, striking against the end of the extractor-rod, urges the extractor forward with a sudden motion, and thereby ejects the cartridge-case. A shoulder on the abutment of the fore-end, acting on an incline on the end of the sliding rod, forces the said rod back so far that it is not within the range of the motion of the sear-like lever, and the ejecting mechanism is not operated by the raising of the breech ends of the barrels until the said rod is urged forward to its original position. This is effected by the falling of the hammer, the breast of which, as the hammer falls, strikes against a projection on the side of the top end of the sliding rod and pushes it forward. The sliding rod is held with the required force in its two positions by a spring-arm.

The vertical arm which strikes against the end of the extractor-rod may be replaced by a horizontal or oblique spring bolt or rod, and the bent with which the sear-like lever engages may be made in the said spring bolt or rod or in the extractor-rod.

My invention is applicable to single and double dropdown guns, the extractor and extracting mechanism of each barrel in the case of double guns being independent of the extractor and extracting mechanism of the other.

Figure 2:
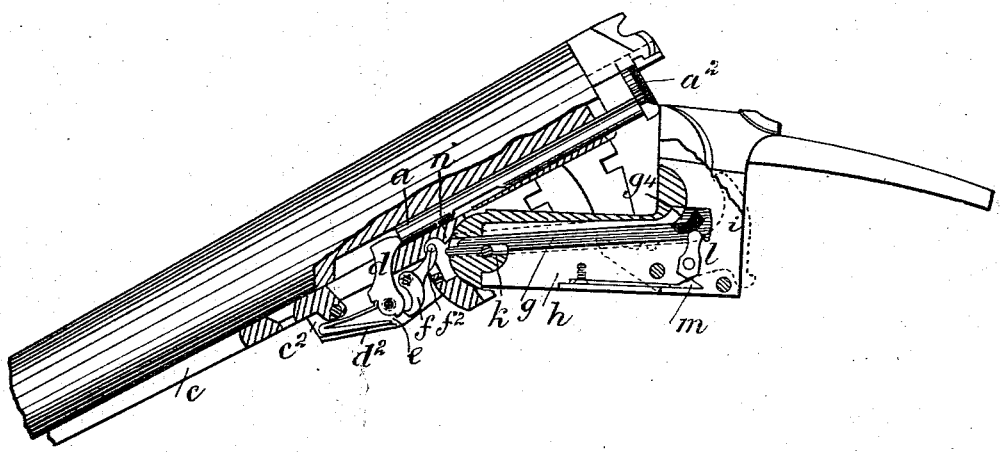
Figure 3:
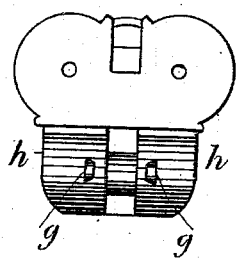
Figure 4:
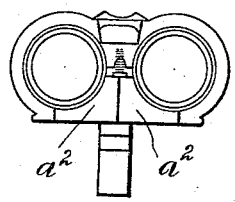
Figure 5:
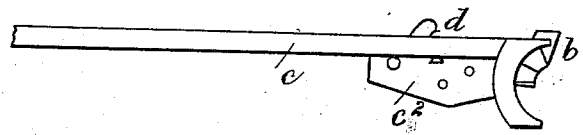
Figure 6:
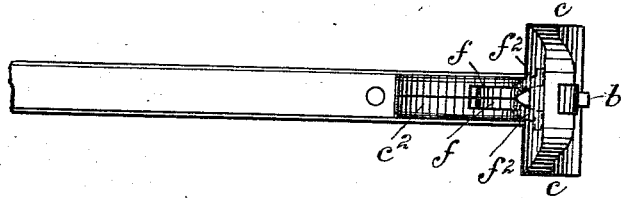
Figure 7:
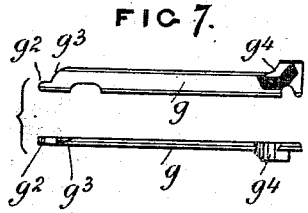
Figure 8:
Figure 9:
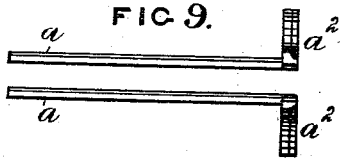
Figure 10:
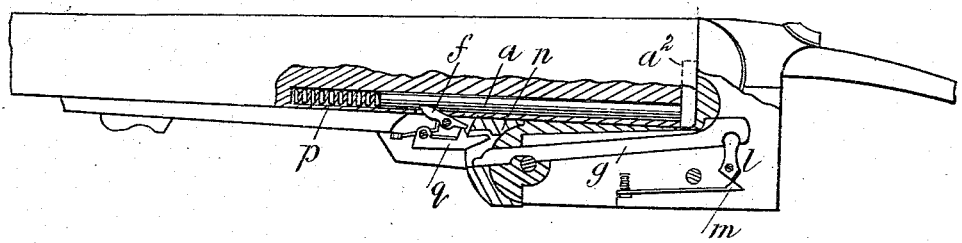
Figure 11:
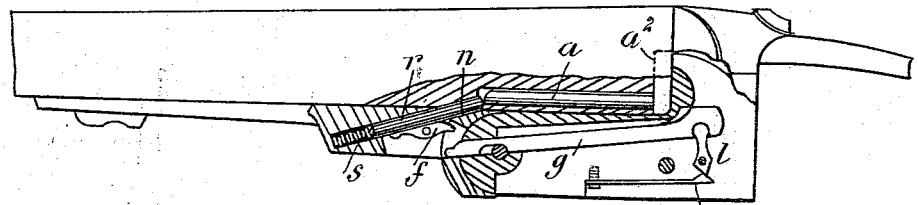
Figure 12:
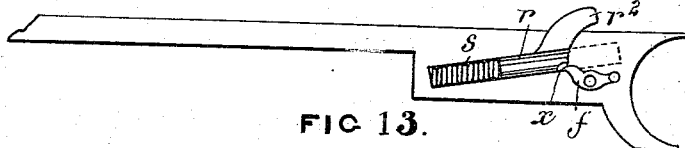
Figure 13:
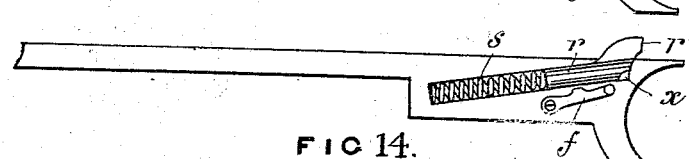
Figure 14:
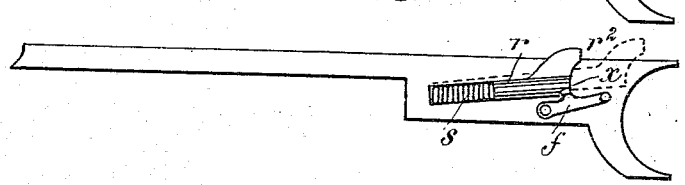

Figures 1 and 2 of the accompanying drawings represent longitudinal vertical sections of the breech end of a double-barrel dropdown gun containing mechanism constructed according to my invention for fully extracting or ejecting the spent cartridge-cases from the barrels, the barrels in Fig. 1 being represented shut down and the ejecting mechanism held out of action, and the barrels in Fig. 2 being represented raised from the face of the break-off and the spent cartridge-cases ejected from the barrels. Fig. 3 represents in end elevation the face of the body of the gun, and Fig. 4 in end elevation the face of the barrels. Fig. 5 represents in side elevation, and Fig. 6 in plan of under side, the fore-end of the gun carrying portions of the ejecting mechanism. Fig. 7 represents in side elevation and edge view the sliding rod, and Fig. 8 the sear-like lever of the ejecting mechanism detached, and Fig. 9 represents the divided extractor which I use with a double gun. Fig. 10 is a longitudinal section showing a modification. Fig. 11 is a similar view showing a further modification. Figs. 12, 13, and 14 are detail views showing further modifications of certain parts, as hereinafter described.

As the ejecting mechanism applied to each portion of the divided extractor in a double gun is the same in construction and action, I will describe the ejecting mechanism of one barrel only of the double gun.

The same letters indicate the same parts in the several figures of the drawings.

$a$ $a^2$ $a$ $a^2$ are the divided parts of the extractor shown detached in Fig. 9, $a$ being the extractor-rod, and $a^2$ the hook part with which the rim of the cartridge-case engages, as is well understood. $b$ is the projection or lifter on the fore-end $c$ of the gun by which the cartridge-case is started. The projection or lifter $b$, which starts the cartridge-case, is of the ordinary kind, and constitutes no part of my invention.

The mechanism for fully extracting or ejecting the spent cartridge-case is constructed as follows: The fore-end $c$ carries a short vertical arm, $d$, turning upon a pin or center supported by the plate $c^2$, fixed to the side of the fore-end $c$ the said arm $d$ being forced when at liberty to move toward the break-off by means of the strong spring $d^2$ pressing under a shoulder on the said arm, as represented. The upper end of the arm $d$ bears against the rod $a$ of the divided extractor. The said arm $d$ has a bent, $e$, at front with which a lever, $f$, similar to an ordinary sear, engages, the said sear-like lever $f$ being carried by the same plate, $c^2$, which carries the nearly vertical arm $d$. The sear-like lever $f$ is represented separately in Fig. 8. The upper arm, $f^2$, of the lever $f$ is bent out of the plane of the sear-arm $f$ (see Figs. 6 and 8) for the purpose hereinafter explained. $g$ is the oblique-sliding rod working in and guided by a dovetail groove (see Fig. 3) in the body $h$ of the gun. The sliding rod $g$ is shown separately in Fig. 7, and is represented in its advanced position in Fig. 1 and in its withdrawn position in Fig. 2. The front end of the sliding rod $g$ has a nose-piece, $g^2$, and adjoining the said nose-piece is a curved part or incline, $g^3$, and the back end of the sliding rod $g$ has a projection, $g^4$, at its side for the breast of the falling hammer $i$ to strike against for giving the said rod a forward motion. The oblique-sliding rod $g$ is limited in its motion by the stop-pin and slot at $k$, and the top end of the rod is supported upon the rocking arm $l$, the upper end of which engages in a recess in the said rod. Upon the V-shaped bottom of the rocking arm $l$ the V-shaped end of the spring $m$ acts. By means of the said spring $m$ the sliding rod $g$ is held in its forward and back positions, respectively, according as the spring $m$ bears upon one or other side of the V-shaped bottom of the rocking arm $l$. The said spring $m$ also tends to force the rod $g$ forward or backward after it has been started by the upper end of the rocking arm $l$ being carried beyond one or other side of its center. $n$ is an inclined shoulder on the abutment of the fore-end $c$ for giving the starting backward motion to the sliding rod $g$ by acting upon the incline $g^3$ on the said rod. When the gun has been discharged, the sliding rod $g$ has the forward position represented in Fig. 1, the said rod having been brought into that position by the breast of the hammer $i$ when discharged striking the side projection, $g^4$, so as to start the said rod forward for a short distance for bringing the spring rocking arm $l$ into operation, as before described.

When the rod $g$ is in the position Fig. 1, its front nose, $g^2$, is situated immediately under the crank-arm $f^2$ of the sear-like lever $f$. On lifting the barrels for recharging the gun the sear-like lever $f$ strikes against the nose $g^2$ of the sliding rod $g$, and the said lever $f$ is disengaged from the bent in the vertical arm $d$. The said arm $d$ being now urged forward by its spring $d^2$, strikes against the end of the extractor-rod $a$, urging forward the extractor-hook $a^2$ with a sudden motion, and thereby ejects the spent cartridge-case from the barrel. As the breech ends of the barrels are lifted the inclined projection $n$ on the abutment of the fore-end $c$, acting on the incline $g^3$ on the rod $g$, forces the said rod slightly backward, so as to cause the spring rocking arm $l$ to take it into the position represented in Fig. 2.

When the rod $g$ is in the position Fig. 2, its front end is not within the range of the motion of the crank-arm $f^2$ of the sear-like lever $f$, and hence the ejecting mechanism is not operated by the raising of the barrels, but the descent of the hammer $i$ causes the sliding rod $g$ to be brought into its advanced position, Fig. 1, ready for releasing the ejecting mechanism on raising the barrels. On closing the barrels after discharge the extractor-rod $a$ forces back the arm $d$ and compresses the spring $d^2$, the said arm $d$ being held in its back position by the engagement of the sear-like lever $f$ with the bent $e$ in the said arm $d$, as represented in Fig. 1.

I will now recapitulate generally the action of the ejecting mechanism. The barrels having been discharged, and the sliding rod $g$ having been urged forward by the falling hammer $i$, the lower end of the said rod $g$ is brought within range of the arm $f^2$ of the sear-like lever $f$, as represented in Fig. 1. On raising the breech ends of the barrels the part $b$ of the ordinary extracting mechanism starts the cartridge-case, and the arm $f^2$ of the sear-like lever $f$ striking against the end $g^2$ of the sliding rod $g$ the said lever $f$ is disengaged from the bent in the vertical arm $d$, and the cartridge-case is ejected by the action of the said arm on the extractor-rod $a$. The sliding rod $g$ is forced back in the manner hereinbefore described, and after the recharging of the barrels their breech ends are shut down. The hook $a^2$ of the extractor is forced to its seat in the end of the barrel, and the vertical arm $d$ forced back by the extractor-rod $a$, and its bent $e$ engaged with the sear-like lever $f$; but until the sliding rod has been urged forward by the fall of the hammer $i$ the ejecting mechanism cannot act; hence the breech ends of the barrels may be raised any number of times without ejecting the unexploded cartridge; but the descent of the hammer $i$ explodes the cartridge and at the same time urges forward the sliding rod $g$, so that the case of the exploded cartridge will be ejected the first time the breech ends of the barrels are raised after the explosion of the cartridge.

Figs. 10 and 11 represent modifications of my invention, in which the vertical arm $d$, hereinbefore described, is dispensed with and a horizontal or oblique spring bolt or rod used.

In the modification Fig. 10, $a$ is the extractor rod, and $a^2$ the hook of the extractor, the said extractor-rod being forced outward to eject the cartridge-case by the compressed coiled spring $p$ at its front end. $f$ is the sear-like lever engaging with a notch or bent in the extractor-rod $a$. Under the sear-like lever $f$ is a releasing-lever, $q$, which is operated upon by the nose of the sliding rod $g$ when the barrels are raised and the said lever $q$ made to act upon the sear-like lever $f$ and disengage it from the extractor-rod $a$. When the extractor-rod $a$ is released, it ejects the spent cartridge-case in the manner hereinbefore described.

In the modification Fig. 11, an oblique bolt or rod, $r$, pressed outward by the spring $s$, operates upon the extractor-rod $a$, and the sear-like lever $f$ engaging with a bent or notch on the said bolt or rod $r$ is released directly by the action of the nose of the sliding rod $g$ upon it when the barrels are raised. On shutting down the barrels the spring $p$ or $s$ in each of the modifications is compressed and the spring rod or bolt $a$ or $r$ held in its pressed-back position by the sear $f$. The rod $g$ is pressed back into its withdrawn position on opening the gun and pressed forward into its advance position by the falling hammer, as hereinbefore described with respect to the principal arrangement of my invention; or the spring-rod $r$ $s$ and the sear-like lever $f$ in the arrangement represented in Fig. 11 may be modified in the manner shown in Figs. 12, 13, and 14. In these arrangements the spring-rod $r$ $s$ is furnished with a head, $r^2$, for operating upon the extractor-rod $a$, Fig. 11, and the sear-like lever $f$ in each arrangement engages with a notch or bent, $x$, at the extreme rear end of the spring-rod $r$.

In Fig. 12 the end of the lever $f$ engages with the bent $x$, and in Figs. 13 and 14 a projection at the middle of the lever $f$ engages with the bent $x$, as seen in Fig. 14.

Having now particularly described and ascertained the nature of my said invention and in what manner the same is to be performed, I declare that what I claim is of improvements in the extracting mechanism of drop-down small-arms—

1. In a dropdown fire-arm, the combination, with one or more extractor-hooks, of a spring-actuated arm pivotally mounted in the fore-end of the piece, a detent holding said arm under the tension of its spring, and a releasing-rod having automatic adjustment longitudinally in the body of the piece, whereby it is thrown into position to trip the detent as the barrel is dropped, substantially as described.

2. The combination, with one or more spring-actuated extractor-hooks, of a detent whereby the spring is held under tension, a releasing-rod having longitudinal adjustment in the body of the piece, a rocking arm engaging with said rod, a spring urging said arm in opposite directions as it passes its center of motion, and means for imparting to the releasing-rod a forward impulse as the piece is fired, to bring it in position to trip the detent as the barrel is dropped, substantially as described.

3. The combination, with one or more extractor-hooks, of a spring-actuated arm adapted to operate said hooks, a detent or sear-like lever engaging with and holding said arm under tension, a releasing-rod which is thrown forward by the hammer into position to trip the detent when the barrel is dropped and is retracted by a shoulder on the fore-end, and a spring-actuated arm holding the releasing-rod at its limit of movement, substantially as described.

4. The combination, with one or more spring-actuated extractor-hooks having a bolt or rod attached, of a detent for holding the spring under tension, a releasing-rod having a point at one end adapted to release the detent, and a shoulder at one side and in rear of said point, an arm mounted on a rock-shaft and connected with the rear end of the rod, and a spring acting successively upon oppositely-beveled faces of the rocking arm, and a shoulder on the fore-end of the piece acting on the shoulder on the releasing-rod, substantially as described.

5. The combination, with one or more spring-actuated extractor-hooks having rods or bolts, of a detent pivoted in the fore end of the piece for holding the actuating-spring under tension, an adjustable releasing-rod carried by the body of the piece, a spring-actuated rocking arm holding the rod at each point of adjustment, a firing-hammer throwing the rod forward in position to trip the detent as the barrel is dropped, a shoulder on the fore-end for restoring the rod, and a stop-pin limiting its movement, substantially as described.

JOHN DEELEY, JR. [L. S.]

Witnesses:
GEORGE SHAW,
RICHARD SKERRETT.